(12) United States Patent
Banhos et al.

(10) Patent No.: US 11,479,002 B2
(45) Date of Patent: Oct. 25, 2022

(54) COMPRESSION TOOL AND METHOD OF FORMING GAS TURBINE ENGINE COMPONENTS

(71) Applicant: Raytheon Technologies Corporation, Farmington, CT (US)

(72) Inventors: Jonas S. Banhos, Rocky Hill, CT (US); Tracy A. Propheter-Hinckley, Rocky Hill, CT (US); Michael Parkin, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 132 days.

(21) Appl. No.: 16/856,460

(22) Filed: Apr. 23, 2020

(65) Prior Publication Data
US 2021/0332708 A1    Oct. 28, 2021

(51) Int. Cl.
*B29C 70/54* (2006.01)
*B29C 70/56* (2006.01)
(Continued)

(52) U.S. Cl.
CPC .......... *B29C 70/541* (2013.01); *B29C 70/543* (2013.01); *B29C 70/56* (2013.01);
(Continued)

(58) Field of Classification Search
None
See application file for complete search history.

(56) References Cited

U.S. PATENT DOCUMENTS

| 5,597,435 A | * | 1/1997 | Desautels | B29C 33/30 264/258 |
|---|---|---|---|---|
| 7,874,059 B2 | | 1/2011 | Morrison et al. | |

(Continued)

FOREIGN PATENT DOCUMENTS

| EP | 2327538 | 9/2012 |
|---|---|---|
| FR | 2958875 | 10/2011 |
| WO | 2013060966 | 5/2013 |

OTHER PUBLICATIONS

European Search Report for European Patent Application No. 21170290.7 completed Sep. 9, 2021.

*Primary Examiner* — Barbara J Musser
(74) *Attorney, Agent, or Firm* — Carlson, Gaskey & Olds, P.C.

(57) ABSTRACT

An assembly for forming a gas turbine engine according to an example of the present disclosure includes, among other things, a layup tool including a main body extending along a longitudinal axis and a flange extending radially from the main body, the flange defining an edge face slopes towards the main body to an axial face. At least one compression tool has a tool body having a first tool section and a second tool section extending transversely from the first tool section. The first tool section is translatable along a retention member in a first direction substantially perpendicular to the edge face such that relative movement causes the second tool section to apply a first compressive force on a composite article trapped between the axial face of the flange and the second tool section. A method of forming a gas turbine engine component is also disclosed.

10 Claims, 8 Drawing Sheets

(51) Int. Cl.
   *B32B 37/10*     (2006.01)
   *B32B 37/18*     (2006.01)
   *B32B 38/18*     (2006.01)
   *F01D 5/28*      (2006.01)
   *F01D 25/16*     (2006.01)

(52) U.S. Cl.
   CPC .............. *B32B 37/10* (2013.01); *B32B 37/18* (2013.01); *B32B 38/1808* (2013.01); *F01D 5/282* (2013.01); *F01D 5/284* (2013.01); *F01D 25/162* (2013.01); *B32B 2305/72* (2013.01); *B32B 2309/12* (2013.01); *F05B 2230/90* (2013.01); *F05C 2253/04* (2013.01); *F05D 2220/323* (2013.01); *F05D 2230/60* (2013.01); *F05D 2260/30* (2013.01); *F05D 2300/6033* (2013.01)

(56) References Cited

U.S. PATENT DOCUMENTS

| | | |
|---|---|---|
| 8,535,042 B1 | 9/2013 | Kirkpatrick et al. |
| 9,573,301 B2 | 2/2017 | Kline et al. |
| 10,316,695 B2 | 6/2019 | Renggli |
| 2014/0314547 A1 | 10/2014 | Sander et al. |
| 2018/0200967 A1 | 7/2018 | Sutter et al. |

\* cited by examiner

FIG.12

COMPRESSION TOOL AND METHOD OF FORMING GAS TURBINE ENGINE COMPONENTS

BACKGROUND

This disclosure relates to a gas turbine engine, and more particularly to forming gas turbine engine components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The engine typically includes one or more ducts that convey airflow through a gas path of the engine. Some ducts may be made of a composite material.

SUMMARY

An assembly for forming a gas turbine engine according to an example of the present disclosure includes a layup tool including a main body extending along a longitudinal axis and a flange extending radially from the main body, the flange defining an edge face slopes towards the main body to an axial face. At least one compression tool has a tool body having a first tool section and a second tool section extending transversely from the first tool section. The first tool section is translatable along a retention member in a first direction substantially perpendicular to the edge face such that relative movement causes the second tool section to apply a first compressive force on a composite article trapped between the axial face of the flange and the second tool section. The first compressive force has a major component in an axial direction relative to the longitudinal axis.

In a further embodiment of any of the foregoing embodiments, the retention member is a bolt extending along a bolt axis. The bolt has threading that mates with threading along a bore defined in the edge face.

In a further embodiment of any of the foregoing embodiments, the layup tool includes a plurality of guide pins extending outwardly from the edge face such that the guide pins are substantially parallel to the bolt axis. The first tool section has a plurality of apertures dimensioned to slidably receive respective ones of the guide pins, and the guide pins are radially and circumferentially offset from the bolt axis.

A further embodiment of any of the foregoing embodiments includes a spring member that urges the bolt along the bolt axis in a second direction away from the first tool portion in an installed position.

In a further embodiment of any of the foregoing embodiments, the second tool section is cantilevered from the first tool section.

In a further embodiment of any of the foregoing embodiments, the relative movement in the first direction causes the second tool section to apply a second compressive force on the composite article. The second compressive force has a major component in a radial direction relative to the longitudinal axis.

In a further embodiment of any of the foregoing embodiments, at least one compression tool includes a plurality of compression tools circumferentially distributed in an array along the flange of the layup tool.

A further embodiment of any of the foregoing embodiments includes at least one bridging tool spanning a respective intersegment gap established between mate faces of an adjacent pair of the compression tools such that the at least one bridging tool distributes at least one of the first and second compressive forces between the compression tools and the composite article.

In a further embodiment of any of the foregoing embodiments, the bridging tool has a generally hook-shaped geometry dimensioned to follow a contour of the adjacent pair of the compression tools.

In a further embodiment of any of the foregoing embodiments, the composite article is a composite layup that forms a composite duct. The composite duct is dimensioned to bound a gas path of a gas turbine engine.

In a further embodiment of any of the foregoing embodiments, the composite article is a composite layup that forms a composite gas turbine component.

A method of forming a gas turbine engine according to an example of the present disclosure includes forming a composite layup along a main body and a flange of a layup tool. The main body extends along a longitudinal axis, and the flange extends in a radial direction from the main body. At least one compression tool mounts to an edge face of the flange at a retention member. The at least one compression tool has a tool body having a first tool section and a second tool section extending transversely from the first tool section. The first tool section moves along the retention member in a first direction towards the edge face of the flange to apply a first compressive force on a portion of the composite layup trapped between an axial face of the flange and the second tool section. The first direction is transverse to the longitudinal axis and substantially perpendicular to the edge face, and the first compressive force has a major component in an axial direction relative to the longitudinal axis.

A further embodiment of any of the foregoing embodiments includes curing the composite layup during the applying of the first compressive force to form a gas turbine engine component.

In a further embodiment of any of the foregoing embodiments, the step of moving the first tool section along the retention member in the first direction causes the second tool section to apply a second compressive force on the composite layup. The second compressive force has a major component in the radial direction.

In a further embodiment of any of the foregoing embodiments, the second tool section is cantilevered from the first tool section during the moving step.

In a further embodiment of any of the foregoing embodiments, the retention member is a bolt extending along a bolt axis intersecting the edge face of the flange. The edge face slopes in a second direction towards the main body. The layup tool includes a plurality of guide pins extending outwardly from the edge face such that the guide pins are substantially parallel to the bolt axis. The first tool section has a plurality of apertures dimensioned to slidably receive respective ones of the guide pins, and the guide pins are radially and circumferentially offset from the bolt axis.

In a further embodiment of any of the foregoing embodiments, the at least one compression tool includes a plurality of compression tools circumferentially distributed in an array along the flange of the layup tool.

A further embodiment of any of the foregoing embodiments includes positioning at least one bridging tool between the composite layup and the second tool section of adjacent pairs of the compression tools such that the at least one bridging tool spans a respective intersegment gap established between mate faces of the adjacent pair of the compression tools. The moving step occurs such that the at least one bridging tool distributes the first and second compressive forces between the compression tools and the composite layup.

A further embodiment of any of the foregoing embodiments includes curing the composite layup during the applying of the first and second compressive forces to form a gas turbine engine component.

In a further embodiment of any of the foregoing embodiments, the gas turbine engine component is a composite duct including a duct body and an arcuate flange following a perimeter of the duct body. The duct body is dimensioned to bound a gas path of a gas turbine engine, and the arcuate flange is formed between the second tool section and the flange of the layup tool.

The various features and advantages of this disclosure will become apparent to those skilled in the art from the following detailed description. The drawings that accompany the detailed description can be briefly described as follows.

DETAILED DESCRIPTION

Figure 1:
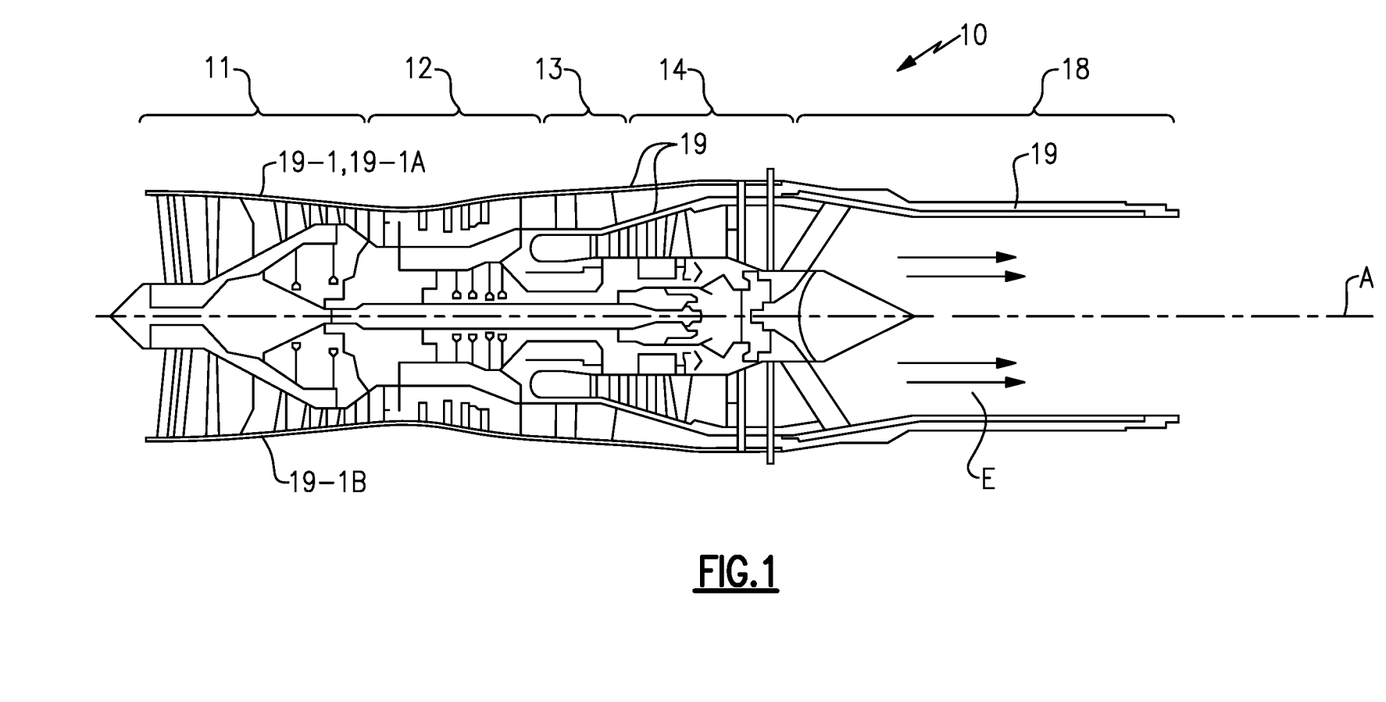
FIG. 1 illustrates an example gas turbine engine.

Referring to FIG. 1, a gas turbine engine 10 includes a fan section 11, a compressor section 12, a combustor section 13, and a turbine section 14. Air entering into the fan section 11 is initially compressed and fed to the compressor section 12. In the compressor section 12, the incoming air from the fan section 11 is further compressed and communicated to the combustor section 13. In the combustor section 13, the compressed air is mixed with gas and ignited to generate a hot exhaust stream E. The hot exhaust stream E is expanded through the turbine section 14 to drive the fan section 11 and the compressor section 12. The exhaust gasses E flow from the turbine section 14 through an exhaust liner assembly 18.

The engine 10 includes one or more ducts 19 arranged about an engine central longitudinal axis A. The ducts 19 are dimensioned to bound a gas path of the engine 10, such as through the fan, compressor, and turbine sections 11, 12, 14 and the exhaust liner assembly 18. In the illustrative example of FIG. 1, the engine 10 includes a first duct 19-1 that bounds a portion of the gas path through the fan section 11. The duct 19-1 includes a pair of duct halves (indicated at 19-1A, 19-1B) that establish a "split" duct arranged about the longitudinal axis A.

Figure 2:
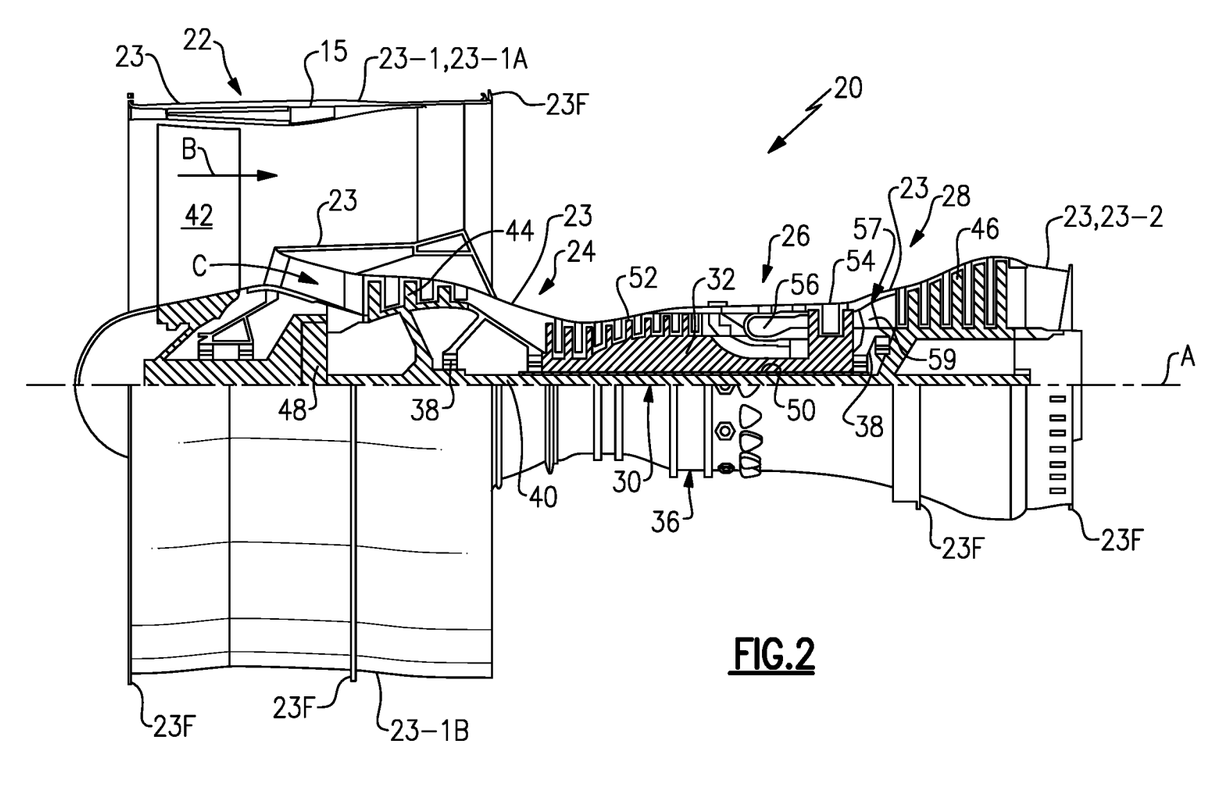
FIG. 2 illustrates another example gas turbine engine.

FIG. 2 schematically illustrates a gas turbine engine 20 according to another example. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518. ° \text{R})]^{0.5}$. The "Low corrected fan tip speed" as disclosed herein according to one non-limiting embodiment is less than about 1150 ft/second (350.5 meters/second).

The engine 20 includes one or more ducts 23 arranged about the engine central longitudinal axis A. The ducts 23 are dimensioned to bound a gas path of the engine 20, such as the bypass flow path B through the fan section 22 and the core flow path C through the compressor and turbine sections 24, 28. Each duct 23 can include one or more flanges 23F dimensioned to mount the duct 23 to another component, such as another one of the ducts 23, or a nacelle or cowling. In the illustrative example of FIG. 2, a first duct 23-1 establishes at least a portion of the housing 15. The first duct 23-1 bounds a flow path through the fan section 22, such as the bypass flow path B. The duct 23-1 includes a pair of duct halves (indicated at 23-1A, 23-1B) arranged about the longitudinal axis A. Another one of the ducts 23-2 can be incorporated in a turbine exhaust case (TEC) of the turbine section 28, for example.

FIGS. 3-6 illustrate an exemplary assembly 60 for forming a composite article or component CC. The component CC can be a composite gas turbine engine component such as composite duct incorporated into one of the ducts 19, 23 of the engines 10, 20, for example. In the illustrative example of FIG. 3-4, the component CC is a composite duct including a main (or duct) body MB and an arcuate flange (or flanged portion) FP following a perimeter of the main body MB. The main body MB of the composite duct is dimensioned to bound a gas path of a gas turbine engine such as the engines 10, 20. Although the disclosed examples primarily refer to ducts, other gas turbine engine components and other systems can benefit from teachings disclosed herein, including composite casings and other structures having a flanged interface and systems lacking a fan for propulsion.

Figures 3, 4:
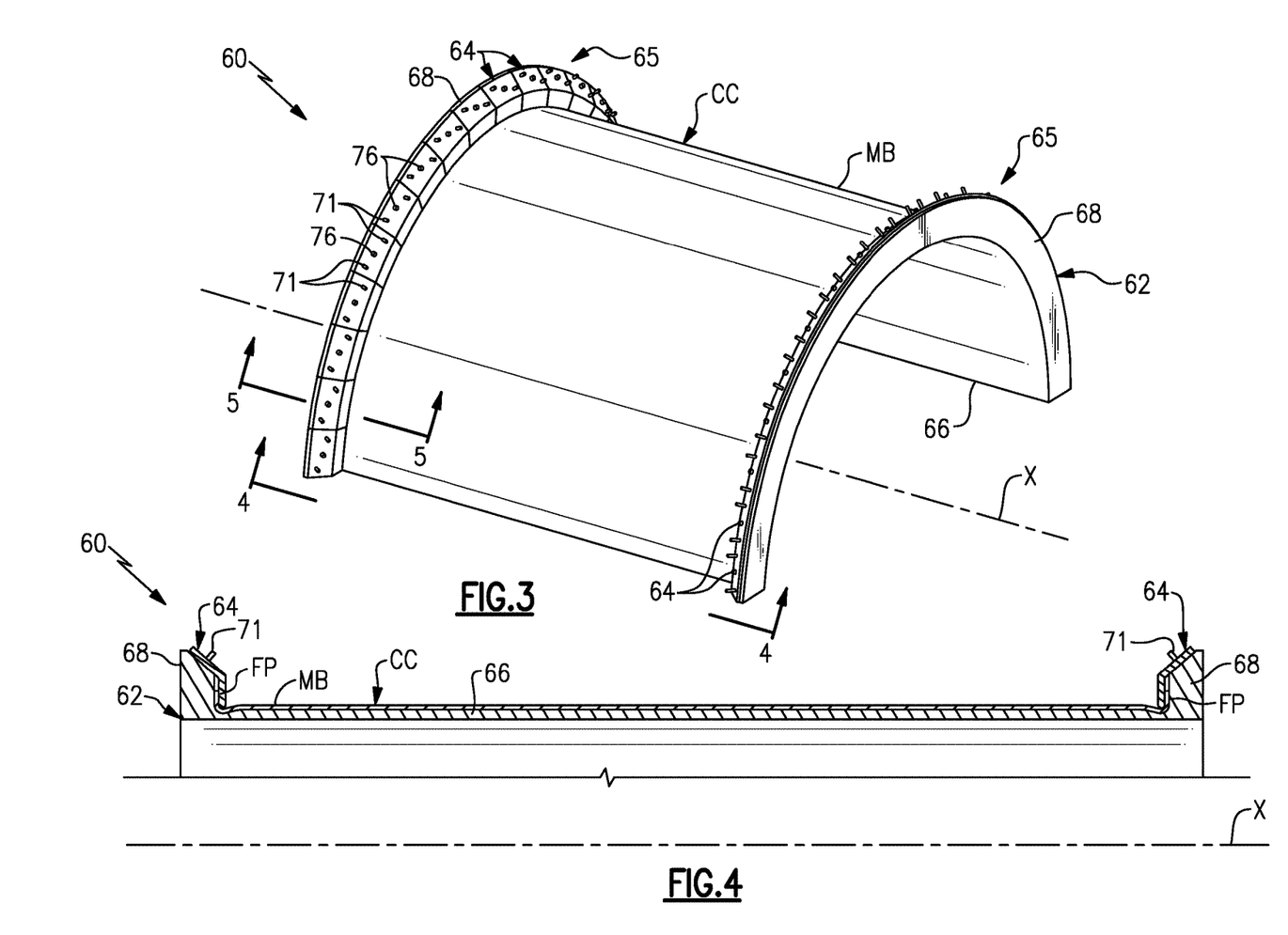
FIG. 3 illustrates a perspective view of an article positioned relative to an assembly.
FIG. 4 illustrates a side view of the assembly taken along line 4-4 of FIG. 3.
Figure 5:
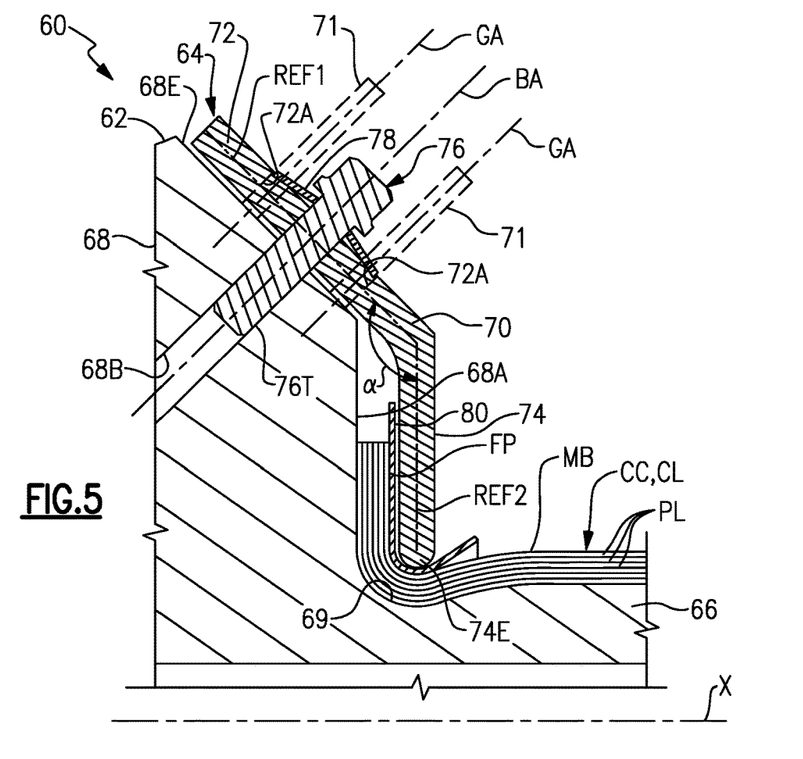
FIG. 5 illustrates a sectional view of the assembly taken along line 5-5 of FIG. 3.

Referring to FIGS. 3-4, the assembly 60 includes a layup tool 62 and at least one compression tool 64 mechanically attached or otherwise secured to the layup tool 62. The layup tool 62 and the compression tool 64 cooperate to apply one or more compressive forces on the composite article during formation of the component CC. The composite article forming the component CC includes a plurality of ply layers PL in stacked relationship to establish a composite layup CL (FIG. 5). The composite layup LL can be utilized to form the component CC.

Various materials can be utilized to form the composite layup CL including the ply layers PL. For examples, the composite layup CL can be constructed from continuous and/or discontinuous fibers arranged in various orientations and in one or more ply layers PL based on structural requirements. Example fiber materials include carbon fiber, fiberglass, an aramid such as Kevlar®, a ceramic such as Nextel™, a polyethylene such as Spectra®. The ply layers PL can be constructed from uni-tape plies having a plurality of fibers oriented in the same direction or can be constructed from a two-dimensional and/or three-dimensional network of fibers, which can be woven or interlaced. Other example fiber constructions include a network of stitched or non-crimped fabrics. The network of fibers can be formed from a dry fiber preform, or can be formed from a pre-impregnated ("prepreg") fabric or tape having fibers pre-impregnated with resin in a matrix, for example. In other examples, the fibers are infused with resin in a matrix subsequent to laying up the ply layers PL on the layup tool 62. In examples, the composite layup CL is made of an organic matrix composite, including silicon (Si) or silicon carbide (SiC) such as a SiC/SiC matrix composite, in an epoxy or resin matrix. The ply layers PL can be constructed from a carbon fiber prepreg in a polyimide matrix material. One or more coating can also be applied to surfaces of the composite layup CL.

The layup tool 62 includes a main body 66 extending along a longitudinal axis X. The layup tool 62 can be dimensioned such that the longitudinal axis X corresponds to the longitudinal axis A of the engines 10, 20. The main body 66 can have a generally arcuate cross-sectional geometry that extends about the longitudinal axis X. In the illustrated example of FIG. 3, the main body 66 is dimensioned to extend circumferentially approximately 180 degrees about the longitudinal axis X. It should be appreciated that the main body 66 can be dimensioned to extend circumferentially less or greater than 180 degrees relative to the longitudinal axis X, such as 360 degrees to establish a full hoop.

The layup tool 62 includes at least one flange 68 extending radially from the main body 66. In the illustrative embodiment of FIGS. 3-4, the layup tool 62 includes a pair of flanges 68 extending from opposed end portions of the main body 66 and includes a plurality of compression tools 64 circumferentially distributed in an array 65 of arc segments along each respective flange 68 with respect to the longitudinal axis X.

Referring to FIG. 5, with continuing reference to FIGS. 3-4, the flange 68 defines an edge face 68E sloping in a direction towards the main body 66 to an axial face 68A. The edge face 68E is joined to the axial face 68A. The axial face 68A extends radially between the main body 66 and edge face 68E. The main body 66 and axial face 68A are joined at an interface 69 having a generally J-shaped cross-sectional geometry including one or more arcuate or radiused segments that establish a substantially smooth transition between surfaces of the main body 66 and axial face 68A.

Other geometries of the interface 69 can be utilized, such as perpendicular and chamfered geometries including planar or conical faces.

Each compression tool 64 includes a tool body 70 having a first tool section 72 and a second tool section 74 that extends transversally from the first tool section 72. In illustrated example of FIGS. 5-6, the second tool section 74 is cantilevered from the first tool section 72, and a free end 74E of the second tool section 74 faces radially towards the longitudinal axis X in an installed position.

The first tool section 72 is dimensioned to extend along a first reference plane REF1, the second tool section 74 is dimensioned to extend along a second reference plane REF2 transverse to the first reference plane REF1. The first reference plane REF1 is transverse to the longitudinal axis X, and the second reference plane REF2 is substantially perpendicular to the longitudinal axis X in an installed position. The reference planes REF1, REF2 of the tool section 72, 74 are dimensioned to establish an angle α. In the illustrative example of FIG. 5, the angle α is an obtuse angle, such as between approximately 120 degrees and approximately 150 degrees (e.g., approximately 135 degrees). For the purposes of this disclosure, the terms "approximately" and "substantially" mean±3% of the stated value unless otherwise stated.

Various techniques can be utilized to mount each compression tool 64 to the layup tool 62. The assembly 60 includes at least one retention member 76 that mounts a respective one of the compression tools 64. Example retention members 76 include pins, fasteners, and rails. In the illustrated example of FIGS. 5-6, the retention member 76 is a bolt or fastener that releasably secures the compression tool 64 to the flange 68 of the layup tool 62. The bolt 76 extends along a bolt axis BA dimensioned to intersect the edge face 68E of the flange 68 in an installed position (FIG. 5). The bolt 76 includes threading 76T that mates with threading along a bore 68B defined in the edge face 68E. The bore 68B is dimensioned such that the bolt axis BA is substantially perpendicular or normal to the edge face 68E and is transverse to the longitudinal axis X in the installed position. A head of the bolt 76 can be dimensioned to receive tooling for applying or regulating torque. In other examples, a nob extends from a head of the bolt 76 which can be manually rotated to apply or regulate torque.

Figure 8:
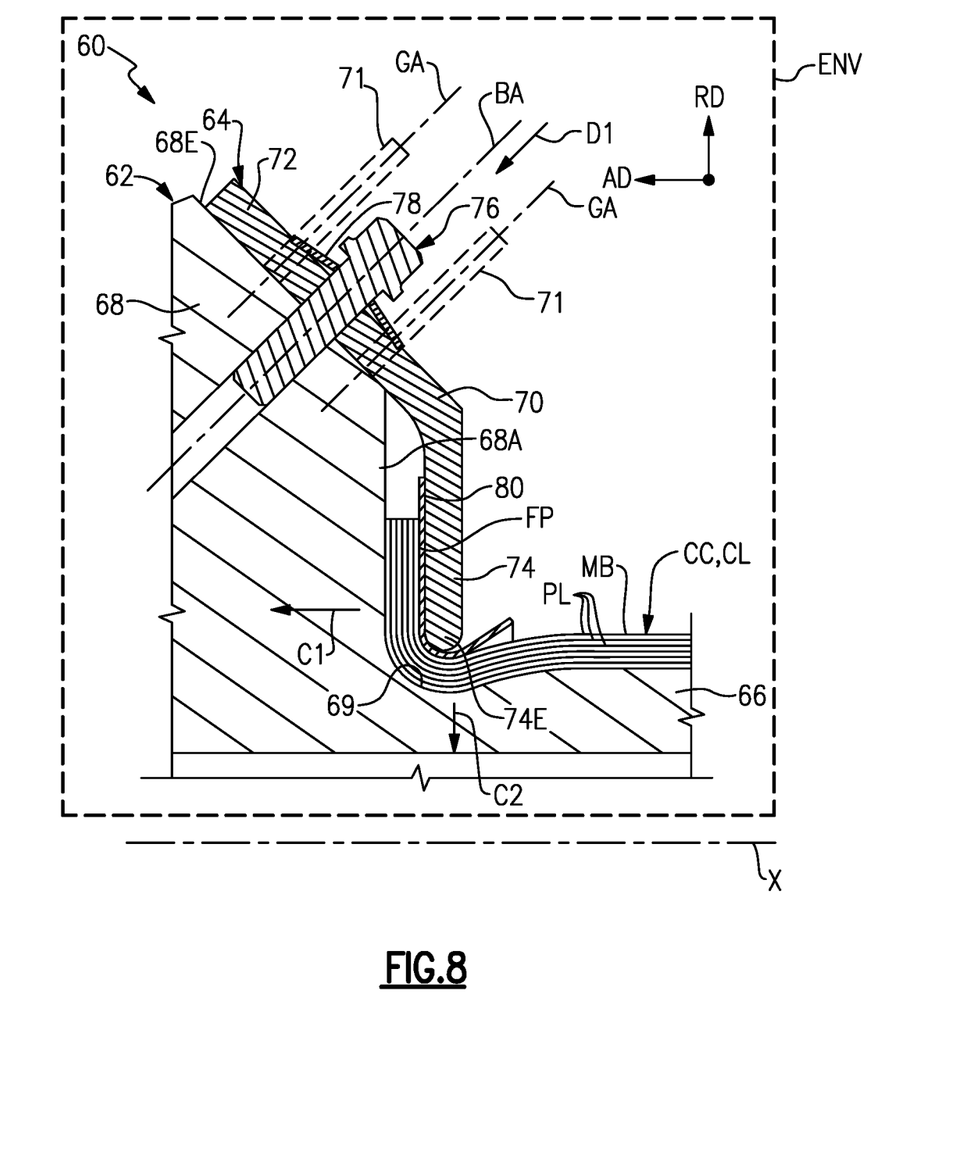
FIG. 8 illustrates the assembly of FIG. 5 in an environment.

The first tool section 72 is translatable along the bolt axis BA of the bolt 76 in a first direction D1 substantially perpendicular to the edge face 68E of the flange 68 such that relative movement causes the second tool section 74 to apply a first (e.g., axial) compressive force C1 and/or second (e.g., downward) compressive force C2 on a composite article such as the composite layup CL trapped between the axial face 68A of the flange 68 and the second tool section 74 of the compression tool 64, as illustrated in FIG. 8. The sloping or inclined plane of the edge face 68E serves to allow for translation of the composite layup CL both horizontally and vertically relative to the longitudinal axis X.

Figure 6:
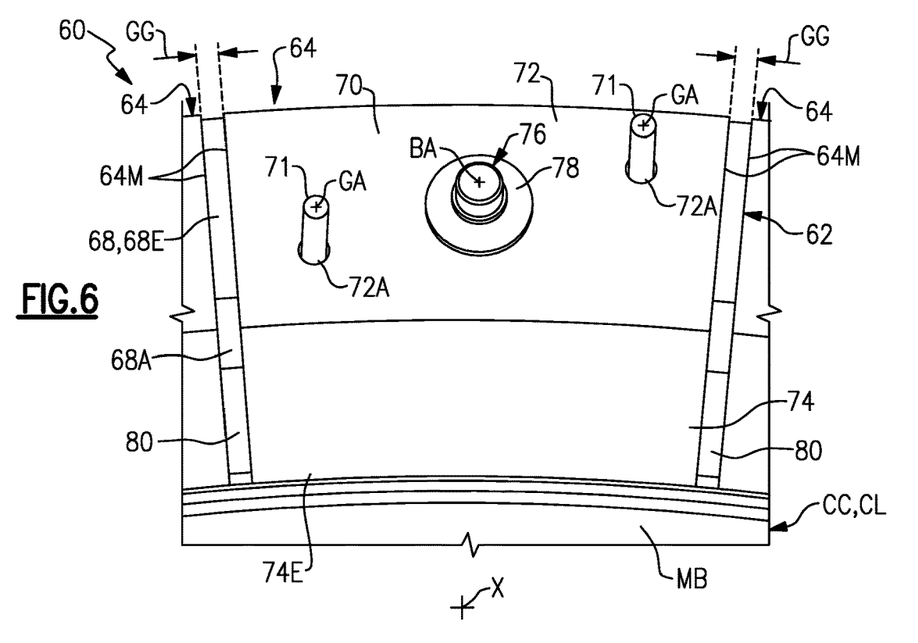
FIG. 6 illustrates an axial view of the assembly of FIG. 5.
Figure 7:
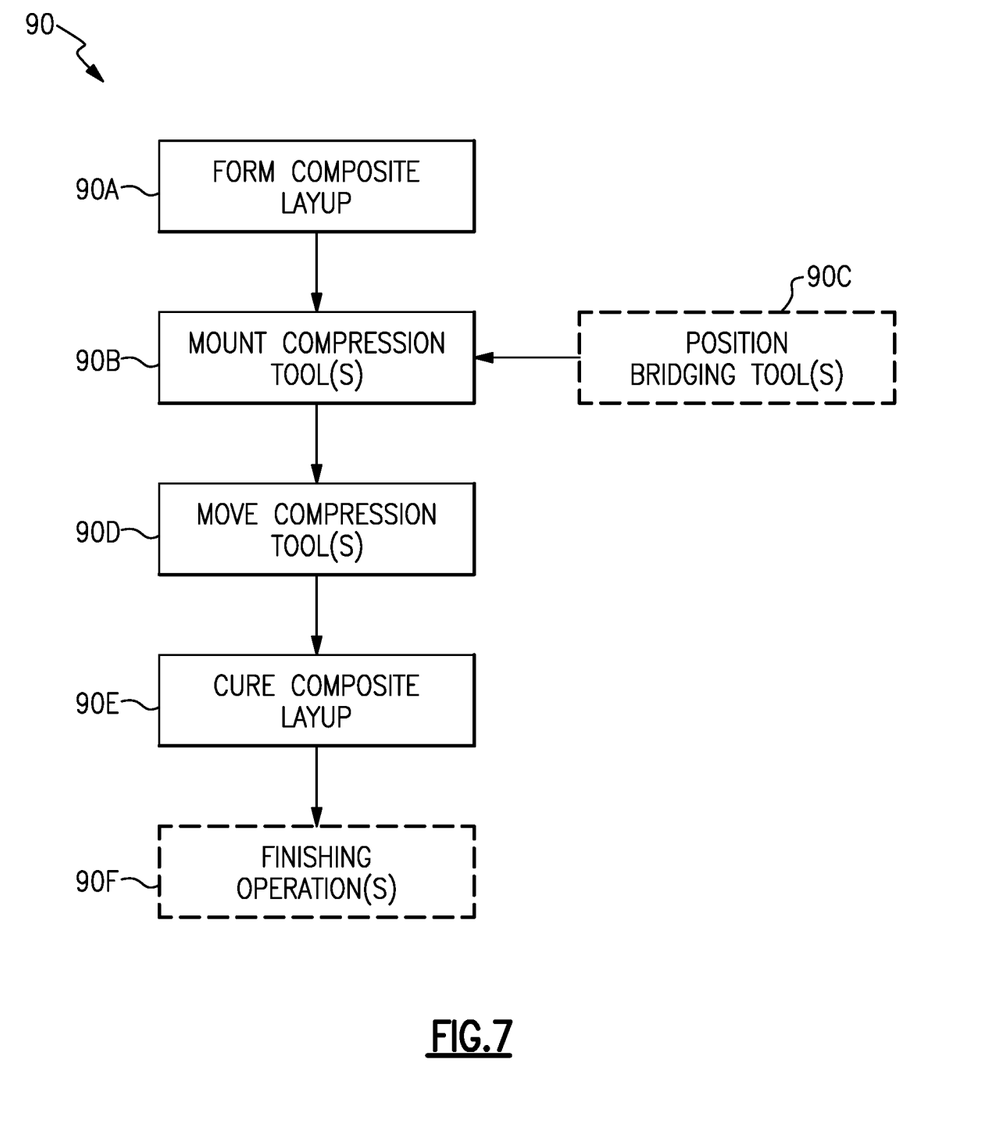
FIG. 7 is an example method in a flow chart of forming an article.

The assembly 60 can include one or more guide pins 71 dimensioned to orient the respective compression tool 64 relative to the flange 68. In the illustrative example of FIGS. 5-6, one or more guide pins 71 extend outwardly from the edge face 68E of the layup tool 62. Each guide pin 71 extends along a respective pin axis GA that is substantially parallel to the bolt axis BA, as illustrated in FIG. 5. The guide pins 71 and bore 68B can be dimensioned such that the pin axes GA of the guide pins 71 are radially and/or circumferentially offset or staggered from the bolt axis BA of the respective bolt 76, as illustrated by FIGS. 5-6.

The first tool section 72 includes one or more apertures 72A extending through a thickness of the first tool section 72. Each aperture 72A is dimensioned to slidably receive a respective one of the guide pins 71 to orient the compression tool 64 relative to the flange 68 and reduce a likelihood of tilting. The apertures 72A can be defined adjacent to respective corners of the first tool section 72, which can increase a wheel base of the compression tool 64. More than two guide pins 71 can be utilized to engage each compression tool 64, such as three guide pins 71 and apertures 72A at respective corners of the first tool section 72 at various orientations and may be the same or differ from an orientation of fibers in one or more of the ply layers PL.

At step 90B, at least one compression tool 64 is mounted to the edge face 68E of the flange 68 at the retention member 76. Step 90B can include mounting a plurality of compression tools 64 circumferentially distributed in an array 65 along the flange 68 of the layup tool 62, as illustrated by FIG. 3. In other examples, the compression tool 64 is dimensioned to extend circumferentially between opposed sides of the flange 68. Intersegment gaps GG can be established between the mate faces 64M of adjacent compression tools 64, as illustrated by FIG. 6. Step 90B can include at step 90C positioning one or more bridging tools 80 between the composite layup CL and the second tool section 74 of adjacent pairs of the compression tools 64 such that each of the bridging tools 80 spans a respective intersegment gap GG and distributes at least one of the first and second compressive forces C1, C2 between the compression tools 64 and the composite layup CL, as illustrated by FIGS. 6 and 8. In other examples, the bridging tools 80 are omitted, and the second tool section 74 directly contacts surfaces of the composite layup CL adjacent to the flange 68.

At step 90D, the first tool section 72 of the compression tool 64 is moved along the retention member 76 in a first direction D1 along the bolt axis BA towards the edge face 68E of the flange 68 such that the relative movement causes the second tool section 74 to apply the first compressive force C1 on the arcuate flanged portion FP of the composite layup CL trapped or seated between the axial face 68A of the flange 68 and the second tool section 74. Step 90D can occur such that the bridging tool 80 is trapped between the axial face 68A of the flange 68 and the second tool section 74. In the illustrative example of FIG. 8, the first direction D1 is transverse to the longitudinal axis X and is substantially perpendicular or normal to the edge face 68E. The first compressive force C1 has a major component in an axial direction AD relative to the longitudinal axis X. In examples, step 90D includes moving the first tool section 72 along the retention member 76 in the first direction D1 such that the relative movement causes the second tool section 74 to apply a second compressive force C2 on the flanged portion FP of the composite layup CL. The second compressive force C2 is substantially perpendicular to the first compressive force C1 and has a major component in the radial direction RD relative to the longitudinal axis X. In the illustrative example of FIG. 8, the bolt axis BA is oriented relative to the edge face 68E of the flange 68 such that the first compressive force C1 is substantially parallel to the longitudinal axis X and such that the second compressive force C2 is substantially perpendicular or normal to the longitudinal axis X.

The compression tools 64 and/or bridging tools 80 may be formed to have a relatively surface low friction, which may prevent or otherwise reduce a likelihood of radially slippage or shearing of the ply layers PL during tightening the bolts 76 or otherwise moving the compression tools 64 towards the flange 68. Various techniques can be utilized to establish a relatively low friction interface, such as by incorporation of low friction materials and/or depositing a lubricant or coating on surfaces of the compression tools 64 and/or bridging tools 80.

The second tool section 74 is cantilevered from the first tool section 72 during the moving step 90D such that the cantilevered portion of the second tool section 74 radially aligned with the flanged portion FP applies the first compressive force C1 on the composite layup CL, and the free end 74E of the second tool portion 74 applies the second compressive force C2 on the main body MB of the composite layup CL. Cantilevering the second tool section 74 can more evenly distribute the compressive forces C1, C2 adjacent the flanged portion FP of the composite layup CL. Step 90D occurs such that the bridging tools 80 distribute or spread the first and/or second compressive forces C1, C2 between the compression tools 64 and the composite layup CL, which may improve uniformity in the finished article.

At step 90E, the composite layup CL is cured to form the composite component CC. The flanged portion FP of the composite layup CL is formed between the second tool section 74 and the flange 68 of the layup tool 62. Various techniques can be utilized to perform step 90E, including an autoclave process or a closed-molding process such as a resin transfer molding (RTM) process or a resin pressure molding (RPM) process to form the composite component CC.

An autoclave or vacuum bagging process is generally known for manufacturing composite articles and typically includes arranging or laying up one or more prepreg sheets or plies on a mold surface to establish a layup, arranging the layup in a vacuum bagging arrangement, and positioning the layup into an autoclave. The layup can be cured in one or more autoclave cycles. The vacuum bag can be removed after cooling, and the cured article can be taken out of the autoclave.

Resin transfer molding (RTM) is generally known for manufacturing composite articles. RTM is a closed-molding process that typically includes fabricating a fiber preform by laying up plies of fiber sheets in a stack, placing the fiber preform in a closed mold, and then saturating the fiber preform with a liquid thermoset resin. The resin is typically mixed with a catalyst or hardener prior to being injected into the closed mold, or can be previously mixed together in a one-part resin system. One-part resin systems already have the catalyst mixed with the resin. The article is heated in the mold to a desired temperature to cure the article. The mold can be heated using a liquid heating system, for example. In some examples, the mold is heated by direct contact with heated platens such as in a compression press or free-standing in an oven. A variation of RTM is vacuum-assisted resin transfer molding (VARTM). In a VARTM process, a vacuum is used to draw the resin into the mold. The RTM process generally results in a part with a slightly lower volume percentage of fiber compared to a part made from prepreg and processed in an autoclave.

Resin pressure molding (RPM) is generally known for manufacturing composite articles. RPM can be considered a variation of an RTM process. RPM is a closed-molding process which includes delivering a liquid resin into a closed mold in which some, or all, of the fiber reinforcement has been pre-impregnated with a resin. Thereafter and similar to RTM, a combination of elevated heat and hydrostatic resin pressure are applied to the mold to cure the article.

Curing the composite layup CL at step 90E occurs during the applying and maintaining of the first and/or second compressive forces C1, C2 to form the component CC. A predefined amount of torque can be applied to the bolt 76 to set an amount of the first and/or second compressive forces C1, C2 for reducing porosity and ply waviness or wrinkling in the flanged portion FP of the component CC. The predefined amount of torque can be set at ambient conditions or room temperature, for example. A likelihood of excessive compression that may otherwise reduce resin content can also be reduced. The torque can be maintained and/or adjusted during step 90E. In examples, step 90E includes heating and/or pressurizing surfaces of the composite layup CL in an environment ENV (shown in dashed lines in FIG. 8 for illustrative purposes). The environment ENV can include any of the examples disclosed herein, such as an autoclave or vacuum bag. In examples, step 90E includes forming the composite layup CL from a carbon fiber prepreg with a polymide matrix and curing the composite layup CL in one or more autoclave cycles. Step 90E can include delivering a quantity of resin into the environment ENV and applying pressure in the environment ENV to inject or infuse resin in the fibers while holding the composite layup CL between the flange 68 and second tool section 74 of the compression tool 64, and heating the composite layup CL to cure the resin. Resin materials can include a thermoset epoxy, for example. The spring member 78 can be utilized to substantially maintain a load on the first tool section 72 in response to relaxation or softening of the composite layup CL during step 90E, which can serve to consolidate the adjacent material of the composite layup CL.

One or more finishing operations can be performed at step 90F. Step 90F can include one or more machine operations on surfaces of the composite component CC. For example, surfaces along the interface 69 to mate with a mounting block BB (shown in dashed lines in FIG. 10 for illustrative purposes). The mounting block BB can be made of a metallic material and can serve to provide structural support to the flanged portion FP of the component CC in an assembled position. The composite component CC can be removed from the assembly 60 prior or subsequent to step 90F.

Figure 9:
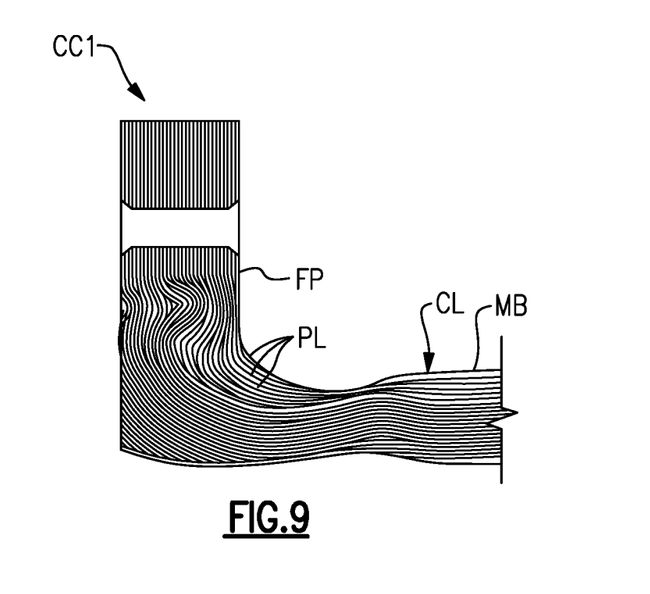
FIG. 9 illustrates a sectional view of a composite article.
Figure 10:
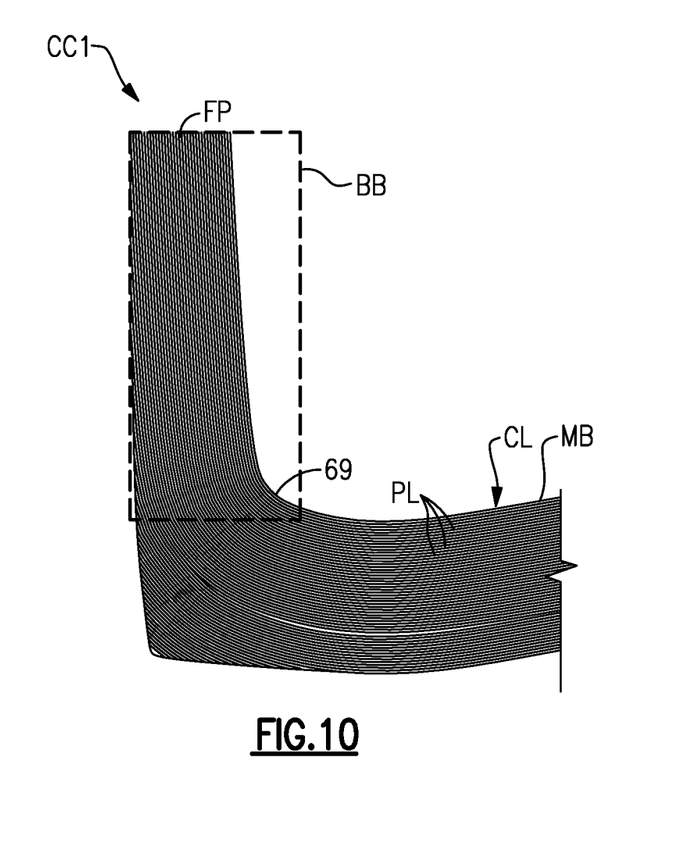
FIG. 10 illustrates a sectional view of another composite article.
Figure 11:
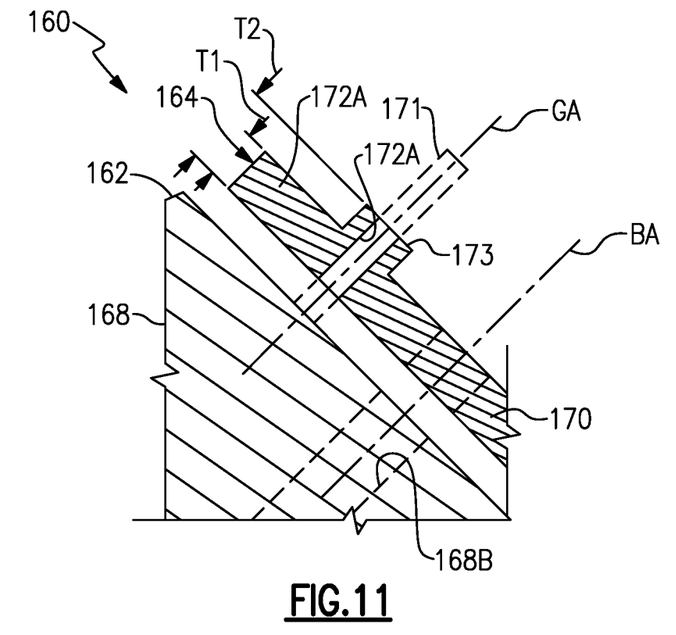
FIG. 11 illustrates a sectional view of another assembly.
Figure 12:
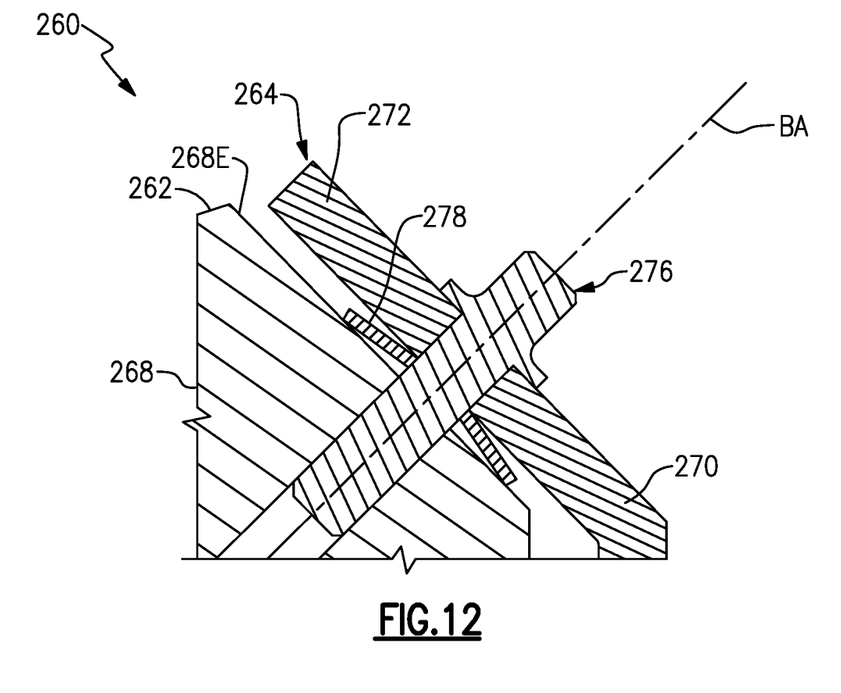
FIG. 12 illustrates a sectional view of yet another assembly.

Utilizing the techniques disclosed herein, compressive forces along the flanged region of the composite articles can be regulated during formation such that the flange region plies PL more closely follow a contour of the layup tool 62. FIG. 9 illustrates a composite article CC1 formed without the benefit of the teachings disclosed herein. FIG. 10 illustrates a composite article CC2 formed with the assembly 60 and/or method 90. As illustrated by FIGS. 9 and 10, the composite article CC2 is relatively more robust and exhibits relatively lesser porosity, ply waviness and thickness variation that the composite article CC1, which can reduce scrap rates, corrective measures including secondary machining operations due to out-of-tolerance conditions along the interface 69 which may otherwise reduce ply integrity, and cost associated with forming the composite articles.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for forming a gas turbine engine component comprising:
   a layup tool including a main body extending along a longitudinal axis and a flange extending radially from the main body, the flange defining an edge face sloping towards the main body to an axial face;
   at least one compression tool including a tool body having a first tool section and a second tool section extending transversely from the first tool section, wherein the second tool section is cantilevered from the first tool section; and
   wherein the first tool section is translatable along a retention member in a first direction substantially perpendicular to the edge face such that relative movement causes the second tool section to apply a first compressive force on a composite article trapped between the axial face of the flange and the second tool section, the first compressive force having a major component in an axial direction relative to the longitudinal axis.

2. The assembly as recited in claim 1, wherein the retention member is a bolt extending along a bolt axis, the bolt including threading that mates with threading along a bore defined in the edge face.

3. The assembly as recited in claim 1, wherein the relative movement in the first direction causes the second tool section to apply a second compressive force on the composite article, the second compressive force having a major component in a radial direction relative to the longitudinal axis.

4. The assembly as recited in claim 3, wherein at least one compression tool includes a plurality of compression tools circumferentially distributed in an array along the flange of the layup tool.

5. The assembly as recited in claim 4, further comprising at least one bridging tool spanning a respective intersegment gap established between mate faces of an adjacent pair of the compression tools such that the at least one bridging tool distributes at least one of the first and second compressive forces between the compression tools and the composite article.

6. The assembly as recited in claim 5, wherein the bridging tool has a generally hook-shaped geometry dimensioned to follow a contour of the adjacent pair of the compression tools.

7. The assembly as recited in claim 6, wherein the composite article is a composite layup that forms a composite duct, wherein the composite duct is dimensioned to bound a gas path of a gas turbine engine.

8. The assembly as recited in claim 1, wherein the composite article is a composite layup that forms a composite gas turbine component.

9. An assembly for forming a gas turbine engine component comprising:
   a layup tool including a main body extending along a longitudinal axis and a flange extending radially from the main body, the flange defining an edge face sloping towards the main body to an axial face;
   at least one compression tool including a tool body having a first tool section and a second tool section extending transversely from the first tool section;
   wherein the first tool section is translatable along a retention member in a first direction substantially perpendicular to the edge face such that relative movement causes the second tool section to apply a first compressive force on a composite article trapped between the axial face of the flange and the second tool section, the first compressive force having a major component in an axial direction relative to the longitudinal axis;
   wherein the retention member is a bolt extending along a bolt axis, the bolt including threading that mates with threading along a bore defined in the edge face; and
   wherein the layup tool includes a plurality of guide pins extending outwardly from the edge face such that the guide pins are substantially parallel to the bolt axis, the first tool section including a plurality of apertures dimensioned to slidably receive respective ones of the guide pins, and the guide pins are radially and circumferentially offset from the bolt axis.

10. The assembly as recited in claim 9, further comprising a spring member that urges the bolt along the bolt axis in a second direction away from the first tool portion in an installed position.

* * * * *